United States Patent
Park (10) Patent No.: US 8,175,066 B2
(45) Date of Patent: May 8, 2012

(54) APPARATUS AND METHOD FOR PROVIDING PACKET DATA SERVICE USING HETEROGENEOUS NETWORKS

(75) Inventor: Do-Jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1186 days.

(21) Appl. No.: 11/999,976

(22) Filed: Dec. 7, 2007

(65) Prior Publication Data

US 2008/0137630 A1 Jun. 12, 2008

(30) Foreign Application Priority Data

Dec. 7, 2006 (KR) .......................... 10-2006-0123815

(51) Int. Cl.
*H04W 4/00* (2009.01)
(52) U.S. Cl. ....................................... 370/338; 370/328
(58) Field of Classification Search .................... 370/338
See application file for complete search history.

(56) References Cited

U.S. PATENT DOCUMENTS

| | | | |
|---|---|---|---|
| 6,947,398 B1 * | 9/2005 | Ahmed et al. ................. | 370/331 |
| 6,973,309 B1 * | 12/2005 | Rygula et al. ................. | 455/436 |
| 7,035,236 B2 * | 4/2006 | Agrawal et al. ............... | 370/331 |
| 7,039,028 B2 * | 5/2006 | Chen et al. ..................... | 370/331 |
| 7,480,272 B2 * | 1/2009 | Baba et al. ..................... | 370/331 |
| 2002/0141360 A1 * | 10/2002 | Baba et al. ..................... | 370/331 |
| 2002/0191558 A1 * | 12/2002 | Agrawal et al. ............... | 370/329 |
| 2002/0191561 A1 * | 12/2002 | Chen et al. ..................... | 370/331 |
| 2003/0018810 A1 * | 1/2003 | Karagiannis et al. ......... | 709/238 |
| 2004/0176023 A1 | 9/2004 | Linder et al. | |
| 2006/0062214 A1 | 3/2006 | Ng et al. | |
| 2006/0114849 A1 * | 6/2006 | Avinash ......................... | 370/328 |
| 2006/0166699 A1 * | 7/2006 | Aghvami et al. .......... | 455/552.1 |
| 2008/0117884 A1 * | 5/2008 | Ishii et al. ..................... | 370/338 |

FOREIGN PATENT DOCUMENTS

| | | |
|---|---|---|
| KR | 1020070041096 A | 4/2007 |
| KR | 1020080062084 A | 7/2008 |

* cited by examiner

*Primary Examiner* — Jeffrey Pwu
*Assistant Examiner* — Gerald Smarth (57) ABSTRACT

An apparatus and method for providing a packet data service by using a plurality of heterogeneous networks is provided. The apparatus includes: a controller for allocating a representative IP address to the terminal and for binding sub-IP address, which are allocated to the terminal by the heterogeneous wireless networks, to the representative IP address; a copy unit for copying an IP packet received from an IP network according to the number of wireless networks to which the terminal is currently connected; and a converter for performing packet conversion on the copied IP packets by using corresponding sub-IP addresses and for transmitting the converted IP packets to the heterogeneous wireless networks. Accordingly, a seamless data service can be provided to a terminal in a service environment where a plurality of wireless communication systems is used.

23 Claims, 7 Drawing Sheets

APPARATUS AND METHOD FOR PROVIDING PACKET DATA SERVICE USING HETEROGENEOUS NETWORKS

CROSS-REFERENCE TO RELATED APPLICATION(S) AND CLAIM OF PRIORITY

The present application claims the benefit under 35 U.S.C. §119(a) of Korean patent application filed in the Korean Intellectual Property Office on Dec. 7, 2006 and assigned Serial No. 2006-123815, the entire disclosure of which is hereby incorporated by reference.

TECHNICAL FIELD OF THE INVENTION

The present invention relates to an apparatus and method for preventing a frequent handover in an environment where a plurality of heterogeneous networks is used. More particularly, the present invention relates to an apparatus and method for providing a service to a terminal concurrently through a plurality of heterogeneous networks.

BACKGROUND OF THE INVENTION

A $4^{th}$ Generation (4G) communication system is expected to be commercialized around 2010. Research is being conducted to provide a service with a data transfer rate of 1 Gigabit per second (Gbps) when stationary and a data transfer rate of at least 100 Megabit per second (Mbps) when on the move. Many new technologies and evolved 2G/3G technologies are being evaluated as candidates for the proposed 4G communication system. Although these technologies provide voice call services as well as high-speed data services based on different service concepts, there is still no breakthrough technology which can be called a 4G technology. According to the existing papers and documents, the 4G technology candidates can be classified into the following three groups.

The first group includes a Wideband Code Division Multiple Access (WCDMA) service and a High-Speed Downlink Packet Access (HSDPA) service, which are evolved from existing 2G or 3G cellular networks and which have been provided by the 3G Partnership Project (3GPP), and also includes a Code Division Multiple Access 2000 (CDMA2000) service, a 1x Evolution for Data Only (1xE-VDO) service, and a 1x Evolution for Data and Voice (1xE-VDV) service, which have been provided by a 3G Partnership Project 2 (3GPP2). These technologies provide an average data transfer rate of only several Mbps. Advantageously, however, the technologies can support a seamless call or data service even when moving at a high-speed and can provide service in almost all areas due to wide cell coverage.

The second group includes a Wireless Metropolitan Area Network (WMAN) service, which is scheduled to be provided as a metropolitan data service by the American Institute of Electrical Electronics Engineers (IEEE) 802.16 protocol. WMAN service is also referred to as IEEE 802.16 service. The WMAN corresponds to WiBro, which was standardized in 2005 by the Republic of Korea. Further, the WMAN is called WiMax in the United States where Intel dominates the market. The WMAN is similar in concept to a conventional cellular network, but can support an average data transfer rate of up to several tens of Mbps. The WMAN was originally designed to support medium-speed mobility up to 60 km/h in a metropolitan area where many people gather and provides cell coverage of up to 1 km.

The third group includes Wireless Local Area Network (WLAN) service, which was developed under IEEE 802.11 so as to replace the existing wired Internet service. The WLAN was standardized in 1999, and has evolved through IEEE 802.11a/b to IEEE 802.11g. The WLAN is now in commercial use and is constantly evolving. At present, the WLAN provides an average data transfer rate of several tens of Mbps, but is expected to provide an average data rate of up to several hundreds of Mbps in the near future. The WLAN is expected to be the first of the 4G technology candidates that can implement a data transfer rate of 1 Gbps when stationary. Disadvantageously, however, the WLAN hardly supports mobility, and thus communication can be provided only within a local cell coverage area of up to 100 meters.

Another candidate for the 4G technologies is an IEEE 802.15 service called "Wireless Personal Area Network (WPAN) service". Although similar to the WLAN, the WPAN provides a much smaller cell coverage than the WLAN and supports data communication with a data transfer rate of at least 1 Gbps. For example, the WPAN service is implemented using ultra near-field high-speed communication technologies such as Ultra-Wideband (UWB) technology and Bluetooth technology. Hereinafter, WLAN and WPAN will be collectively referred to as "WLAN".

Figure 1:
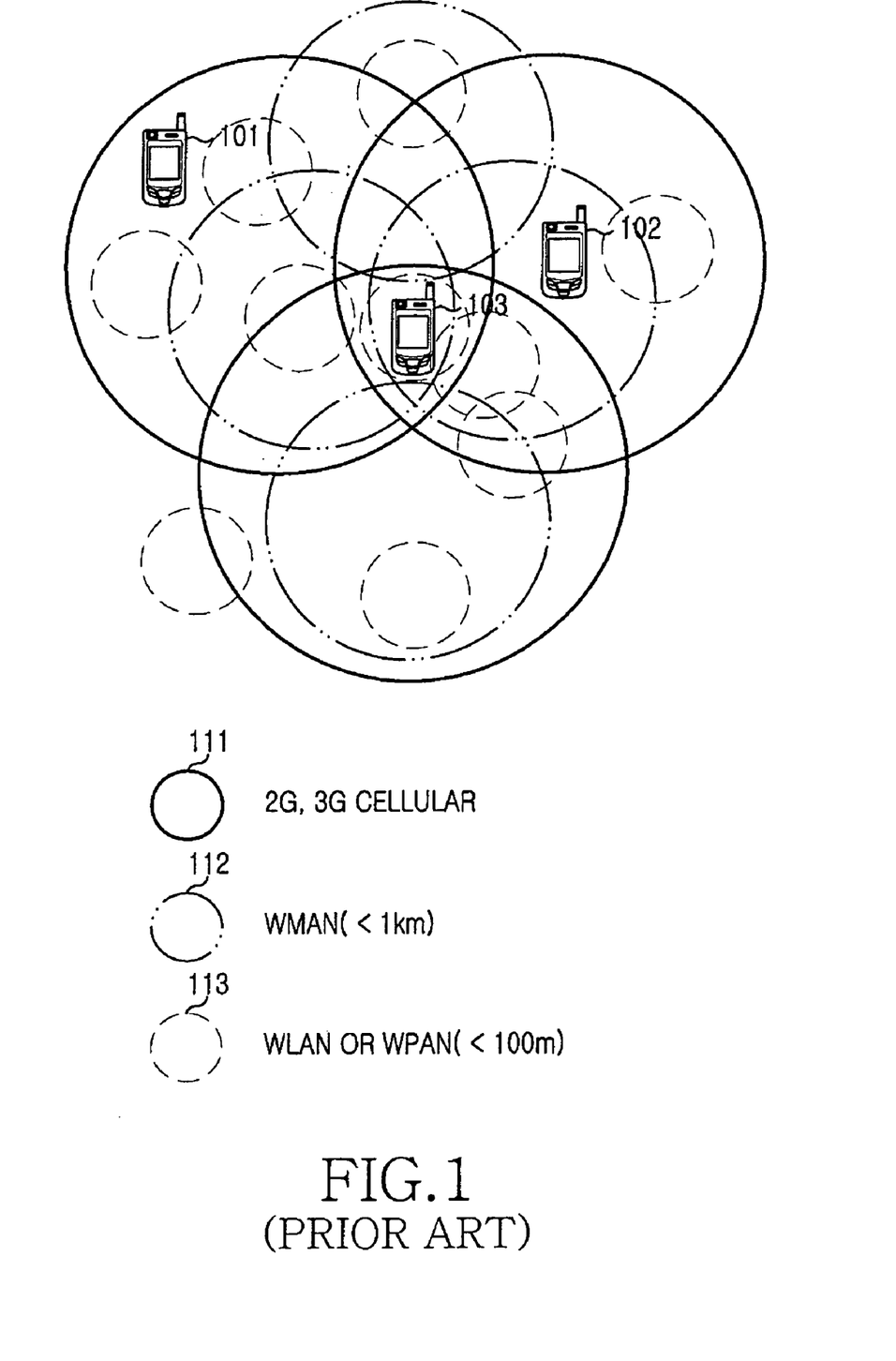
FIG. 1 illustrates a radio access environment in which a plurality of heterogeneous networks are used.

FIG. 1 illustrates a radio access environment in which a plurality of heterogeneous networks is used.

A network 111 having the largest cell coverage indicates a 2G/3G cellular network. A network 112 having a medium-sized cell coverage indicates a WMAN. A network 113 having the smallest cell coverage indicates a WLAN. It will be assumed that a terminal 103 can use all of the aforementioned network services.

The terminal 103 can connect and communicate with the cellular network in an area 101. The terminal 103 can connect and communicate with the cellular network or the WMAN in an area 102. The terminal 103 can connect and communicate with the cellular network, the WMAN, and the WLAN in an area 103. As such, when the terminal 103 can connect with several wireless communication networks, according to the conventional technologies, the terminal 103 performs a switching operation through either a vertical handover or radio reconfiguration to select only one of the network services providing the best throughput.

However, when one of the network services is selected, the following problems may occur.

First, when a terminal moves with a certain speed, a handover occurs frequently. Thus, control information is frequently exchanged between different wireless systems, which may lead to an overhead against high-speed data transmission.

Second, when a terminal connected to a WLAN or WMAN moves with a high speed that cannot be supported in the WLAN or WMAN, communication may be broken since data transmission and reception cannot be smoothly made. If communication is broken, the terminal reconnects to a cellular network that can support a high-speed data service, which may lead to another overhead.

SUMMARY OF THE INVENTION

To address the above-discussed deficiencies of the prior art, it is a primary object the present invention to address at least the above-mentioned problems and/or disadvantages and to provide at least the advantages described below. Accordingly, an aspect of the present invention is to provide an apparatus and method for providing a seamless service to a terminal which moves between heterogeneous networks in an environment where a plurality of heterogeneous networks are used.

Another aspect of the present invention is to provide an apparatus and method for ensuring a Quality of Service (QoS) in a terminal which moves between heterogeneous networks in an environment where a plurality of heterogeneous networks are used.

Another aspect of the present invention is to provide an apparatus and method for preventing a frequent handover in an environment where a plurality of heterogeneous networks is used.

Another aspect of the present invention is to provide an apparatus and method for reducing a signaling overhead resulted from a handover between heterogeneous networks in an environment where a plurality of heterogeneous networks are used.

According to an aspect of the present invention, an apparatus for providing a service to a terminal through a plurality of heterogeneous wireless networks is provided. The apparatus includes: a controller for allocating a representative Internet Protocol (IP) address to the terminal and for binding sub-IP address, which are allocated to the terminal by the heterogeneous wireless networks, to the representative IP address; a copy unit for copying an IP packet received from an IP network according to the number of wireless networks to which the terminal is currently connected; and a converter for performing packet conversion on the copied IP packets by using corresponding sub-IP addresses and for transmitting the converted IP packets to the heterogeneous wireless networks.

According to another aspect of the present invention, a terminal is provided. The terminal includes: a plurality of interface modules for communicating with a plurality of heterogeneous wireless networks; and an IP conversion sub-layer unit for binding a representative IP address allocated by an IP conversion server and sub-IP addresses allocated by the heterogeneous wireless networks, for sorting IP packets received concurrently from the heterogeneous wireless networks according to sequence numbers, and for selecting one IP packet for each sequence number.

According to another aspect of the present invention, a communication method of a terminal is provided. The method includes: being allocated with a representative IP address by an IP conversion server and binding the representative IP address and sub-IP addresses allocated by heterogeneous wireless networks; receiving IP packets concurrently from the heterogeneous wireless networks when moving to a service overlap area of the heterogeneous wireless networks; and sorting the received IP packets according to sequence numbers and selecting one IP packet for each sequence number.

According to anther aspect of the present invention, a system for communicating packet data is provided. The system includes: an IP conversion server for binding a representative IP address allocated to a terminal and sub-IP addresses allocated to the terminal by heterogeneous wireless networks, for copying an IP packet to be transmitted according to the number of heterogeneous wireless networks to which the terminal is currently connected, for performing packet conversion on the copied IP packets by using corresponding sub-IP addresses, and for transmitting the converted IP packets to the heterogeneous wireless networks; and the terminal for sorting IP packets concurrently received through the heterogeneous wireless networks according to sequence numbers and for selecting one IP packet for each sequence number.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technique of the present invention will hereinafter be described in which a seamless service is provided to a terminal which moves between heterogeneous networks in an environment where a plurality of heterogeneous networks are used. The present invention provides a concurrent data service to a terminal through heterogeneous networks in a situation where the terminal is located in a service overlap area of the heterogeneous networks. Thus, the present invention can prevent a vertical handover which may frequently occur in an environment where a plurality of heterogeneous networks is used.

It will be assumed hereinafter that the terminal moves between an Institute of Electrical Electronics Engineers (IEEE) 802.16-based Broadband Wireless Access (BWA) system and a $2^{nd}$ Generation (2G)/$3^{rd}$ Generation (3G)-based cellular system. However, the present invention may also apply to other packet communication systems as long as all heterogeneous networks are Internet Protocol (IP)-based packet communication systems.

Figure 2:
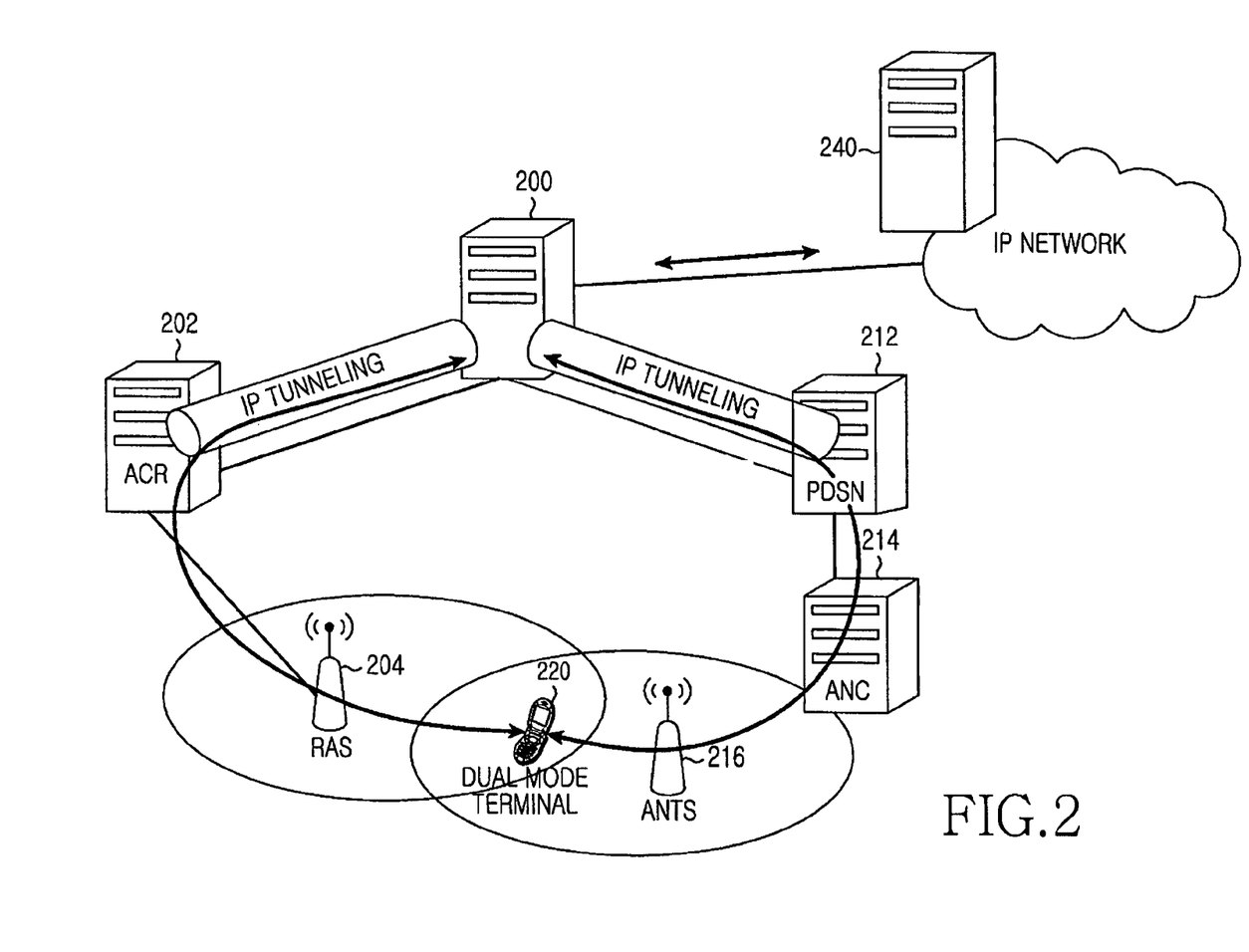
FIG. 2 illustrates a network configuration according to the present invention.

FIG. 2 illustrates a network configuration according to the present invention.

Referring to FIG. 2, a network of the present invention includes an IP conversion server 200, which is located between an IP network and a radio access network, broadband wireless access (BWA) systems 202 and 204, cellular systems 212, 214, and 216, a dual mode terminal 220, and an application server 240. It will be assumed hereinafter that the cellular systems 212, 214, and 216 are 1x Evolution for Data Only (1xEV-DO) systems.

Regarding the BWA systems 202 and 204 of FIG. 2, the access control router (ACR) 202 receives a packet from the IP conversion server 200 and transmits the received packet to the radio access station (RAS) 204. The ACR 202 manages connectivity and mobility of the terminal 220 and generates a unique service flow (SF) for each of the uplink and downlink connections. The RAS 204 receives a packet from the ACR 202 and transmits the received packet to the dual mode terminal 220. Further, the RAS 204 converts the packet received from the ACR 202 into a radio frequency (RF) signal and transmits the RF signal to the dual mode terminal 220.

Regarding the cellular systems 212, 214, and 216 of FIG. 2, the packet data serving node (PDSN) 212 provides an interface function between the IP network and the radio access network. That is, the PDSN 212 terminates a data link layer and performs packet routing and tunneling. The access network controller (ANC) 214 receives a packet from the PDSN 212 and transmits the received packet to the access network transceiver system (ANTS) 216. The ANC 214 performs a Unicast Access Terminal Identifier (UATI) management (i.e., allocation and de-allocation), a handover, and the like. The ANTS 216 receives a packet from the ANC 214 and transmits the received packet to the dual mode terminal 220. The ANTS 216 converts the packet received from the ACR 202 into an RF signal and transmits the RF signal to the dual mode terminal 220.

The dual mode terminal 220 is a mobile terminal that can operate both with a BWA system and a cellular system. Thus, the dual mode terminal 220 can receive packets concurrently from the two systems. Therefore, when located in a service overlap area of heterogeneous networks, the dual mode terminal 220 sorts packets received from at least two heterogeneous networks according to sequence numbers and thus can reproduce the sorted packets by using an application program. Since the same packet is received from two different networks, two identical packets can be received if no error occurs. In this case, the dual mode terminal 220 selects one of the identical packets received from the heterogeneous networks and discards the other packet.

For address management, the IP conversion server 200 allocates a representative IP address to the dual mode terminal 220 and binds a first IP address used in the BWA system and a second IP address used in the cellular system to the representative IP address. The representative IP address is defined as an IP address used to facilitate communication between an application program of the dual mode terminal 220 and an application server 240. The representative IP address may be determined to be either the first IP address or the second IP address. The IP conversion server 200 copies an IP packet received from the application server 240 to generate two IP packets, converts headers of the copied IP packets, that is, converts IP addresses, and transmits the resultant IP packets to the dual mode terminal 220 through heterogeneous networks.

As such, according to the present invention, since the dual mode terminal 220 can receive data concurrently from a plurality of heterogeneous networks, a seamless service can be provided even when on the move, and a vertical handoff is not necessary. It has been described in the present embodiment that one IP packet is copied to generate two IP packets, and the IP packets are then transmitted through different wireless networks. However, in another embodiment, transmission IP packets may be multiplexed to a plurality of wireless networks.

The above descriptions of FIG. 2 have been focused on downlink or forward link data transmission. However, the present invention may also apply to uplink or reverse link data transmission. That is, the terminal 220 copies an IP packet to generate two IP packets, converts headers of the copied IP packets, and transmits the resultant IP packets to the IP conversion server 200 through different networks. Then, the IP conversion server 200 selects one of the two packets received through the different networks, converts a header of the selected packet, and transmits the resultant packet to the application server 240.

Figure 3:
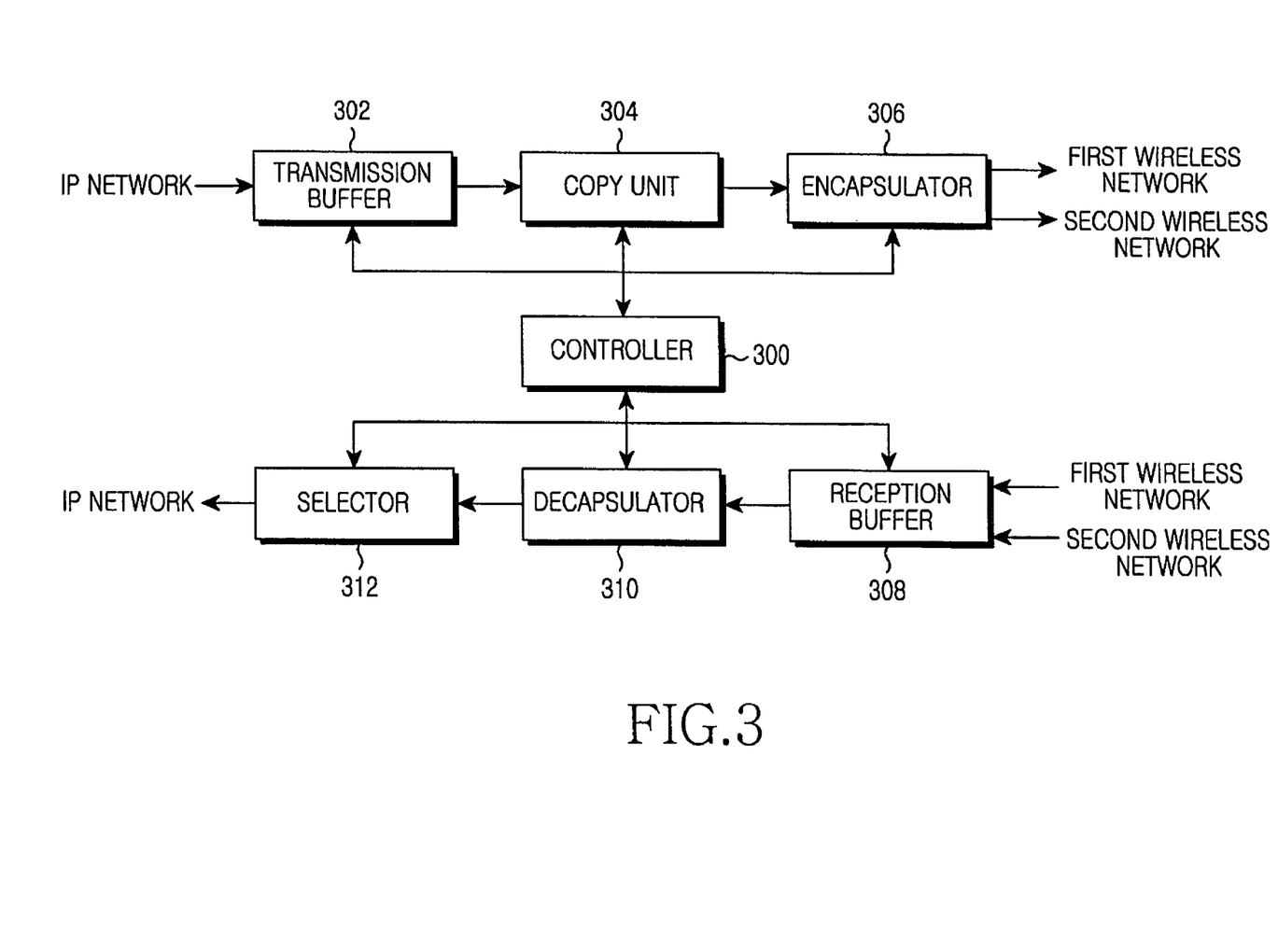
FIG. 3 is a block diagram of an Internet Protocol (IP) conversion server according to the present invention.

FIG. 3 is a block diagram of the IP conversion server 200 according to the present invention.

Referring to FIG. 3, the IP conversion server 200 includes a controller 300, a transmission buffer 302, a copy unit 304, an encapsulator 306, a reception buffer 308, a decapsulator 310, and a selector 312. In order for the IP conversion server 200 to transmit the same IP packet concurrently through different wireless networks, IP packet conversion is required. Examples of the IP packet conversion are Generic Routing Encapsulation (GRE) and Network Address Translation (NAT). It will be assumed hereinafter that the GRE (i.e., tunneling) technique is used.

The controller 300 controls overall operations of the IP conversion server 200 and manages a representative IP address of the terminal 220 and sub IP addresses which are allocated to the terminal 220 through radio access networks. For address management, the controller 300 binds the sub IP addresses to the representative IP address.

The controller 300 checks headers of the packets buffered in the transmission buffer 302 and thus obtains the representative IP address as well as the sub IP addresses which are bound to the representative IP address. Further, the controller 300 controls the number of times of performing a packet copying operation by the copy unit 304 according to the number of sub IP addresses, and then provides the sub IP addresses to the encapsulator 306.

The transmission buffer 302 buffers IP packets received from an IP network (i.e., application server) and outputs the buffered packets to the copy unit 304 under the control of the controller 300. The IP packets are packets to be transmitted to the dual mode terminal 220. The representative IP address of the terminal 220 is recorded in IP headers.

The copy unit 304 copies an IP packet received from the transmission buffer 302 until a predetermined number of IP packets are generated under the control of the controller 300. It will be assumed herein that the IP packet is copied one time to generate two identical IP packets.

The encapsulator 306 performs encapsulation in such a manner that GRE headers are respectively added to the two identical IP packets provided from the copy unit 304. The encapsulated packets are respectively transmitted to corresponding radio access networks. That is, the two identical IP packets are transmitted to the terminal 220 through different radio access networks.

On the contrary, the IP packets transmitted from the terminal 220 are received by the IP conversion server 200 through different radio access networks. The reception buffer 308 buffers the IP packets received from the different radio access networks (i.e., first and second wireless networks) and outputs the buffered packets to the decapsulator 310 under the control of the controller 300.

The decapsulator 310 performs decapsulation so that the GRE headers are removed from the IP packets provided from the reception buffer 308. The selector 312 sorts the IP packets provided from the decapsulator 310 according to sequence numbers and checks the existence of packets having the same sequence number. If the packets having the same sequence number exist, one of the packets is selected, and the remaining packets are discarded. In this case, time stamp information of each packet may be used to select one of the packets having the same sequence number. For example, a packet having a small delay may be selected by using the time stamp information. The selected packets are transmitted to the IP network (i.e., application server).

Figure 4:
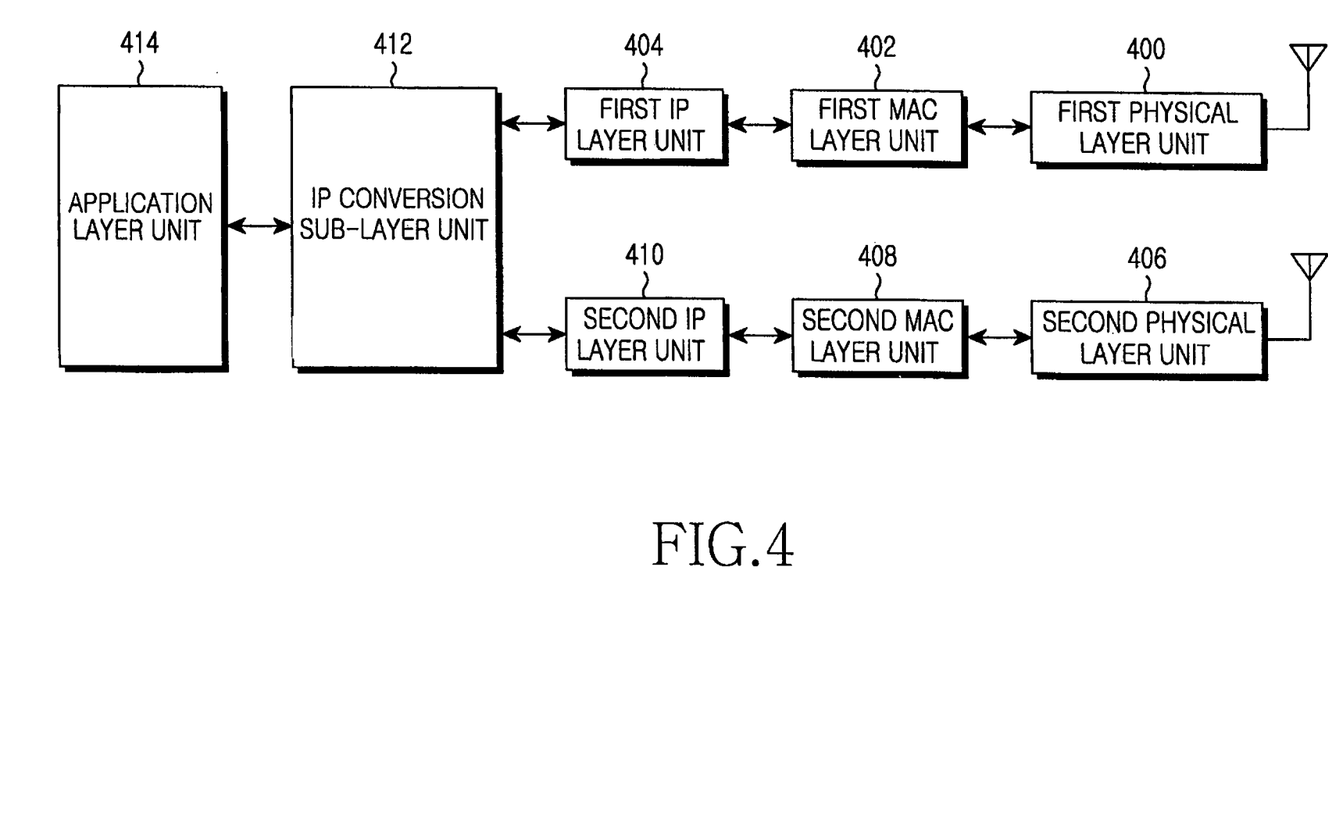
FIG. 4 is a block diagram of a dual mode terminal according to the present invention.

FIG. 4 is a block diagram of the dual mode terminal 220 according to the present invention.

Referring to FIG. 4, the dual mode terminal 220 includes a first physical layer unit 400, a first Media Access Control (MAC) layer unit 402, a first IP layer unit 404, a second physical layer unit 406, a second MAC layer unit 408, a second IP layer unit 410, an IP conversion sub-layer unit 412, and an application layer unit 414. For convenience of explanation, the following description will focus on a receiving operation.

When located in a service overlap area of heterogeneous networks, the terminal 220 operates in a mode in which communication can be made concurrently through both the first and second wireless networks. The first physical layer unit 400 is a MOdulator-DEModulator (MODEM) for performing wireless communication with the first wireless network. If the first wireless network is an IEEE 802.16-based radio access network, the first physical layer unit 400 converts an RF signal received through an antenna into a baseband signal, performs Orthogonal Frequency Division Multiplexing (OFDM) modulation on the baseband signal, and demodulates and decodes the OFDM-modulated signal, thereby restoring information data.

The first MAC layer unit 402 generates and analyzes a control message (i.e., MAC message) of the first wireless network, packetizes the information data provided from the first physical layer unit 400 into IP packets, and delivers the IP packets to the first IP layer unit 404. The first IP layer unit 404 analyzes headers of the IP packets, sorts the IP packets provided from the first MAC layer unit 402 according to sequence numbers, and delivers the sorted IP packets to the second physical layer unit 406.

The second physical layer unit 406 is a MODEM for performing wireless communication with the second wireless network. If the second wireless network is a 2G/3G-based radio access network, the second physical layer unit 406 converts an RF signal received through an antenna into a baseband signal, de-spreads the baseband signal, and demodulates and decodes the de-spread signal, thereby restoring information data.

The second MAC layer unit 408 generates and analyzes a control message of the second wireless network, packetizes the information data provided from the second physical layer unit 406 into IP packets, and delivers the IP packets to the second IP layer unit 410. The second IP layer unit 410 analyzes headers of the IP packets, sorts IP packets provided from the second MAC layer unit 408 according to sequence numbers, and delivers the sorted IP packets to the second physical layer unit 406.

For address management, the second physical layer unit 406 binds sub-IP addresses allocated by the first and second wireless networks to the representative IP address allocated to the terminal 220. Thus, the second physical layer unit 406 analyzes IP packets provided from the first IP layer unit 404 and the second IP layer unit 410, sorts the IP packets according to sequence numbers, and selects one packet for each sequence number. In this case, time stamp information of each packet may be used to select one of packets having the same sequence number. Further, the second physical layer unit 406 delivers the selected IP packets to the application layer unit 414. The application layer unit 414 analyzes data delivered from a lower layer unit and provides a corresponding service to a user.

Packet transmission may be carried out in a reverse manner as that described in the receiving operation. In brief, the IP conversion sub-layer unit 412 packetizes service data provided from the application layer unit 414 into an IP packet and copies the IP packet to generate two packets. The IP conversion sub-layer unit 412 respectively records sub-IP addresses to the copied IP packets and delivers the packets recorded with the sub-IP packets to corresponding IP layer units. The IP packets delivered to the IP layer units are transmitted to corresponding wireless networks through corresponding MAC layer units and physical layer units.

Figure 5:
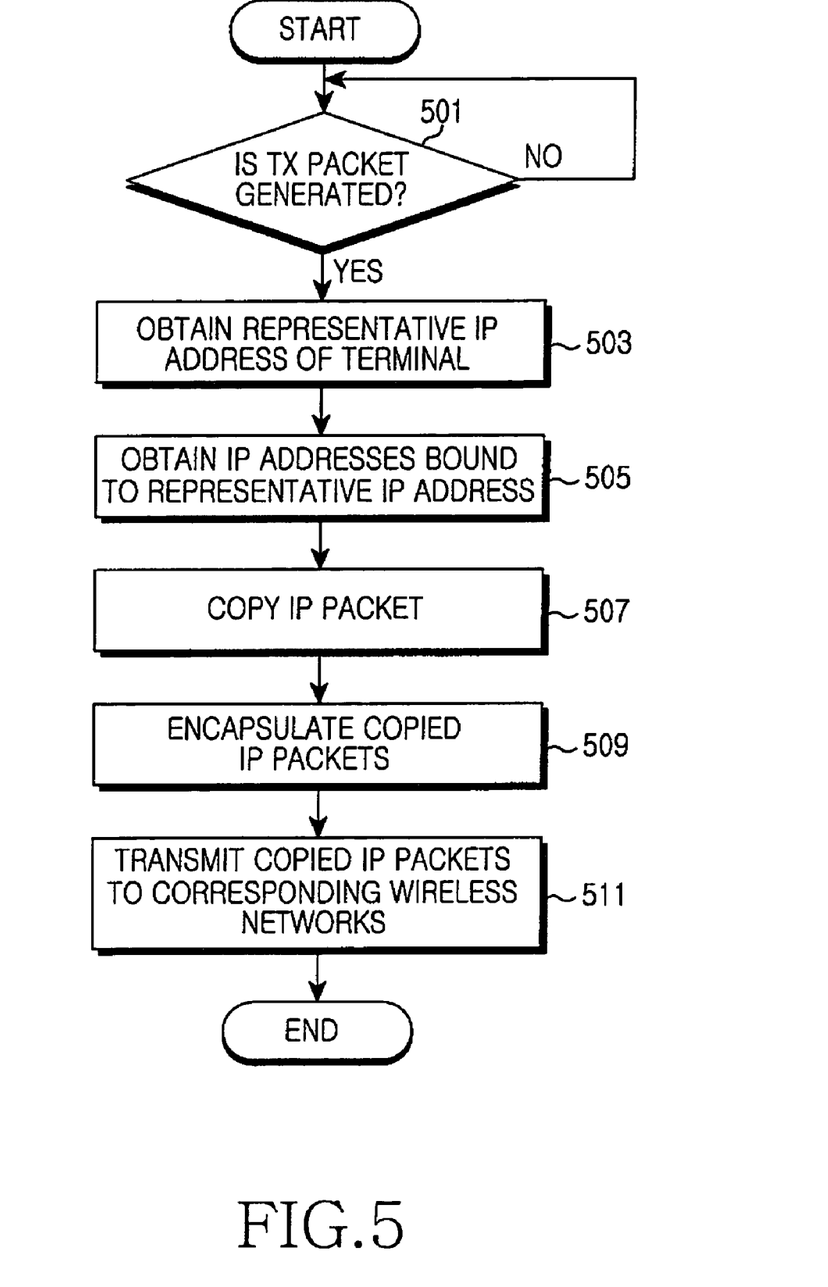
FIG. 5 is a flowchart illustrating a process of transmitting a packet in a transmitter according to the invention.

FIG. 5 is a flowchart illustrating a process of transmitting a packet in a transmitter according to the present invention. The transmitter is for exemplary purpose only. According to whether data is transmitted or received, the transmitter may be either the IP conversion server 200 or the terminal 220.

Referring to FIG. 5, the transmitter checks whether a transmission (Tx) IP packet is generated in step 501. When the Tx IP packet is generated, the transmitter checks a header of the Tx IP packet and thus obtains a representative IP address allocated to the dual mode terminal 220 in step 503. The representative IP address is an address allocated by the IP conversion sub-layer unit 200. In step 505, the transmitter obtains sub-IP addresses bound to the representative IP address. The sub-IP addresses are addresses allocated to the terminal 220 by different wireless networks.

In step 507, the transmitter copies the Tx IP packet according to the number of sub-IP addresses bound to the representative IP address. In step 509, the transmitter respectively encapsulates the copied IP packets by using corresponding sub-IP addresses, and then performs IP packet conversion. The encapsulation is performed so that the IP packets are respectively transmitted via corresponding wireless networks. GRE or NAT may be used in the encapsulation.

In step 511, the transmitter transmits the IP packets to corresponding wireless networks. If the transmitter is the IP conversion sub-layer unit 200, the IP packets are transmitted to the terminal 220 through a plurality of radio access networks. If the transmitter is the terminal 220, the IP packets are transmitted to the IP conversion sub-layer unit 200 through the plurality of radio access networks.

Figure 6:
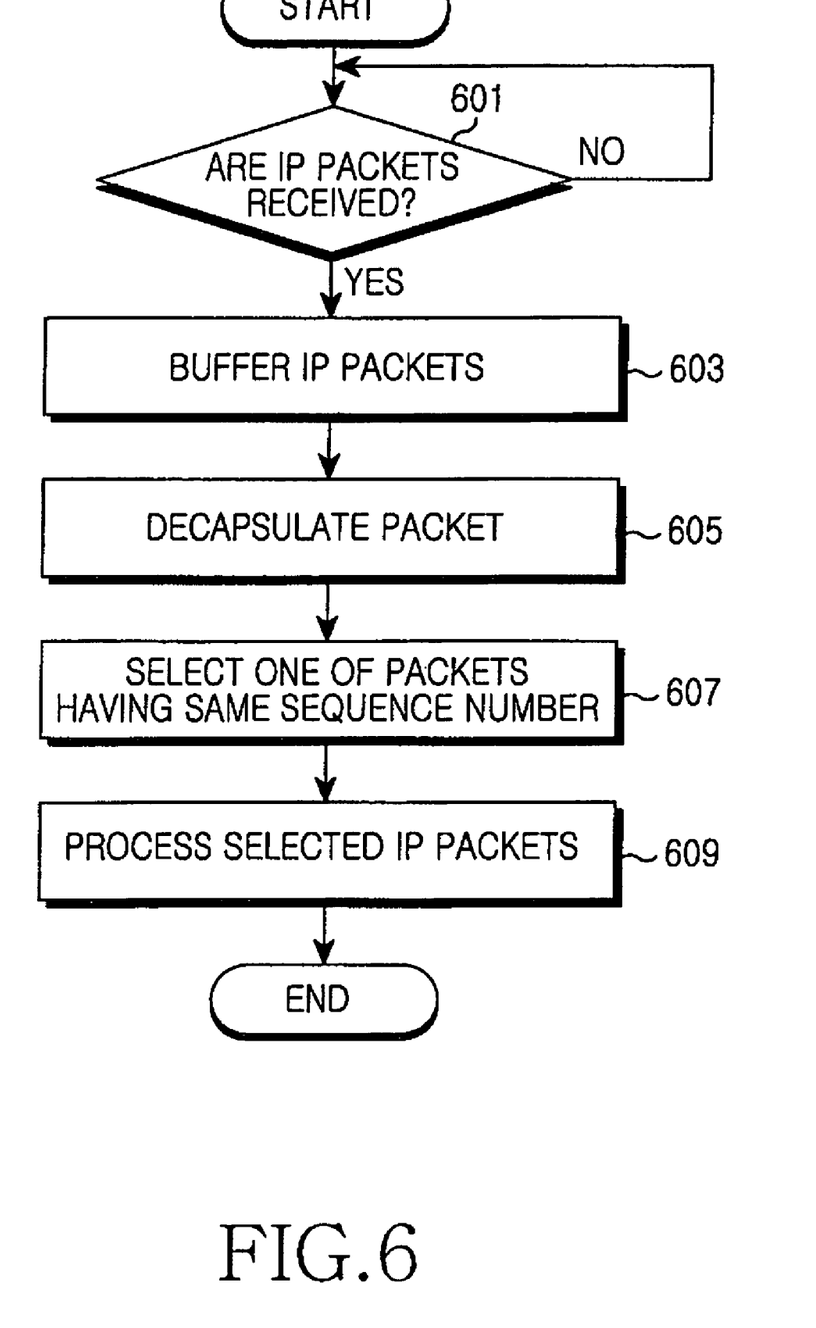
FIG. 6 is a flowchart illustrating a process of receiving a packet in a receiver according to the invention.

FIG. 6 is a flowchart illustrating a process of receiving a packet in a receiver according to the present invention. The receiver is for exemplary purpose only. According to whether data is transmitted or received, the receiver may be either the IP conversion server 200 or the terminal 220.

Referring to FIG. 6, the receiver checks whether IP packets are received in step 601. Upon receiving the IP packets, the receiver buffers the received IP packets in step 603.

In step 605, the receiver decapsulates the buffered IP packets and analyzes the IP packets. In step 607, the receiver sorts the packets according to sequence numbers, and checks the existence of packets having the same sequence number. If the packets having the same sequence number exist, the receiver selects one packet for each sequence number. In this case, time stamp information of each packet may be used to select one of the packets having the same sequence number.

In step 609, the receiver performs a relevant process on the selected IP packets. If the receiver is the IP conversion sub-layer unit 200, the selected IP packets may be transmitted to the application server 240. If the receiver is the terminal 220, the selected IP packets may be processed by an application layer unit.

Now, a general signal exchange process according to the present invention will be described.

Figure 7:
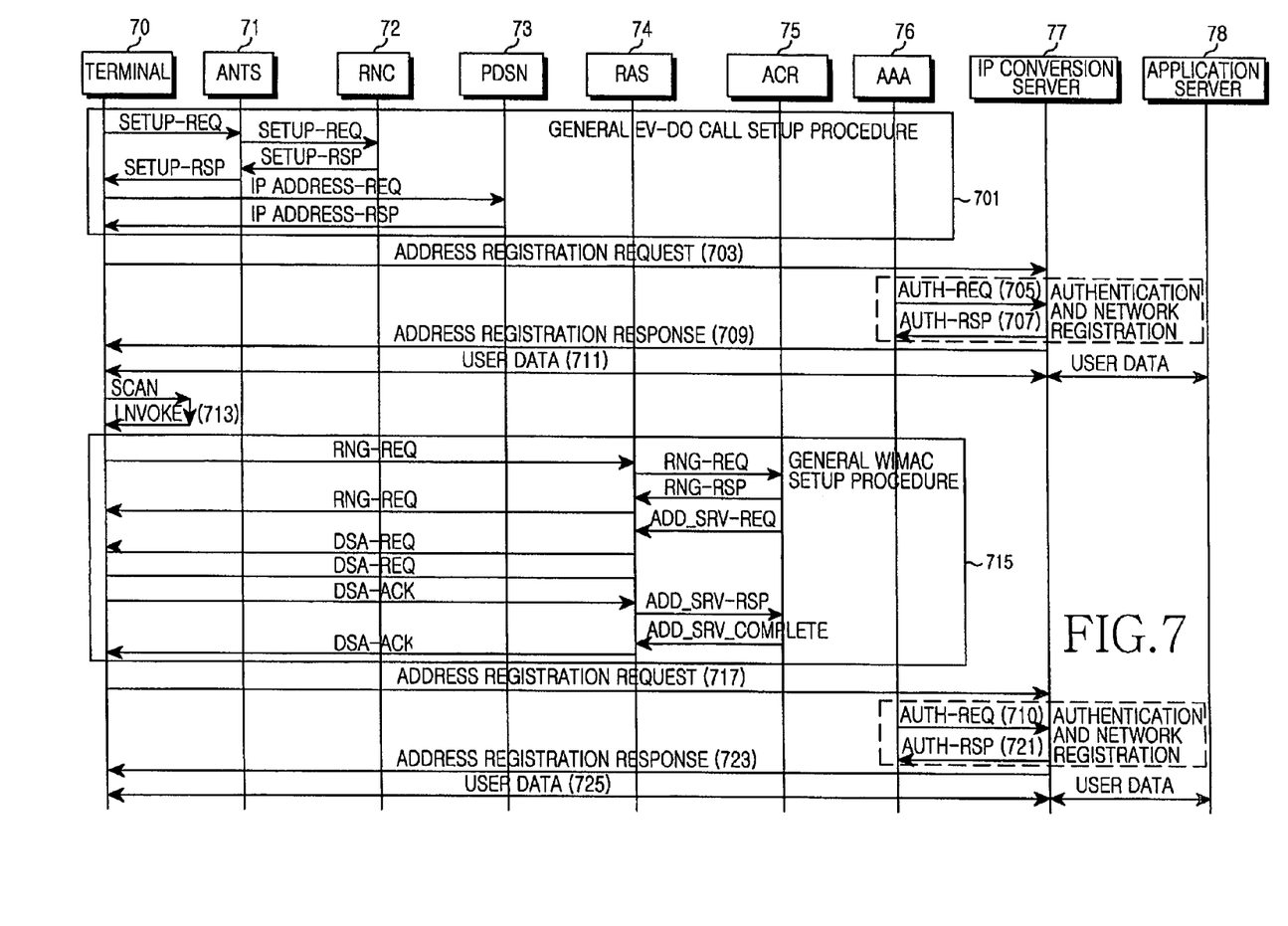
FIG. 7 illustrates a process of providing a service concurrently from a plurality of heterogeneous networks to a terminal, according to the present invention.

FIG. 7 illustrates a process of providing a service concurrently from a plurality of heterogeneous networks to a terminal, according to the present invention. It will be assumed herein that the network configuration of FIG. 2 is used, and the terminal moves from a cellular system (e.g., 1xEV-DO system) to a BWA system.

Referring to FIG. 7, a terminal 70 located in a service area of a 2G/3G-based cellular system performs a setup procedure with respect to the cellular system in step 701. In this step, an IP address is allocated to the terminal 70 by the cellular system.

In step 703, the terminal 70 transmits an address registration request message to an IP conversion server 77 so as to register the allocated IP address. The address registration request message may include an identifier (e.g., telephone number) of the terminal 70, the IP address, etc.

In step 705, upon receiving the address registration request message, the IP conversion server 77 sends an authentication request message AUTH-REQ to an Authentication, Authorization, and Accounting (AAA) server 76, so as to authenticate the terminal 70. In step 707, an authentication response message AUTH-RSP is received in response to the authentication request message AUTH-REQ.

In step 709, if the authentication on the terminal 70 is successful, the IP conversion server 77 allocates a representative IP address to the terminal 70, and transmits an address registration response message including the representative IP address to the terminal 70 in response to the address registration request message.

Thereafter, for address management, the IP conversion server 77 and the terminal 70 bind the representative IP address and an IP address (i.e., first sub-IP address) allocated by the cellular system, and the terminal 70 operates an application program by using the representative IP address. The IP conversion server 77 performs tunneling so that a packet to be transmitted to the terminal 70 is transmitted via the cellular system. In this case, the IP conversion server 77 may perform IP packet conversion by using GRE or NAT.

In step 711, the terminal 70 and the IP conversion server 77 exchange user data via the cellular system by the aid of the tunneling of the IP conversion server 77.

While communicating with the cellular system, the terminal 70 periodically monitors a BWA system in step 713. When the terminal 70 moves to a service overlap area and thus a signal of the BWA system is detected, the terminal 70 performs a setup procedure with respect to the BWA system in step 715. In this case, an IP address (i.e., second sub-IP address) is allocated to the terminal 70 by the BWA system.

Thus, the terminal 70 drives a MODEM of the cellular system and a MODEM of the BWA system at the same time.

In step 717, the terminal 70 transmits an address registration request message to the IP conversion server 77, so as to register the allocated second sub-IP address. The address registration request message may include an identifier (e.g., telephone number) of the terminal 70, the second sub-IP address, etc.

In step 719, upon receiving the address registration request message, the IP conversion server 77 sends an authentication request message AUTH-REQ to the AAA server 76, so as to authenticate the terminal 70. In step 707, an authentication response message AUTH-RSP is received in response to the authentication request message AUTH-REQ.

In step 723, if the authentication on the terminal 70 is successful, the IP conversion server 77 allocates a representative IP address to the terminal 70, and transmits an address registration response message including the representative IP address to the terminal 70 in response to the address registration request message. In this case, since the representative IP address has already been allocated to the terminal 70, the allocated representative IP address is transmitted to the terminal 70.

Thereafter, for address management, the IP conversion server 77 and the terminal 70 bind the representative IP address and the first and second sub-IP addresses, and the terminal 70 operates an application program by using the representative IP address. The IP conversion server 77 performs tunneling so that a packet to be transmitted to the terminal 70 is transmitted via both the BWA system and the cellular system. In this case, the IP conversion server 77 may perform IP packet conversion by using GRE or NAT. That is, the IP conversion server 77 copies a packet of the terminal 70 to generate two packets, encapsulates the packets by using corresponding sub-IP addresses, and transmits the resultant packets to corresponding systems.

In step 725, the terminal 70 and the IP conversion server 77 exchange user data via the BWA system by the aid of the tunneling of the IP conversion server 77.

As such, through steps 711 and 725, the terminal 70 can exchange the user data with respect to an application server 78 through two different radio access networks. That is, since the terminal 70 can receive data concurrently from a plurality of heterogeneous networks according to the present invention, a seamless service can be provided even when on the move. In addition, a vertical handoff is not necessary. If the terminal 70 further moves and thus escapes from a service area of the cellular system, the MODEM of the cellular system stops its operation, and a signal of the cellular system is periodically detected. When located outside a service area of a specific system, the terminal 70 may request the IP conversion server 77 to release the binding of the sub-IP address allocated by the system.

According to the present invention, a seamless data service can be provided to a terminal in a service environment where a plurality of wireless communication systems is used. Further, a handoff (or vertical handoff) which may frequently occur between heterogeneous networks can be prevented. Furthermore, a signaling overhead resulted from the frequent handoff can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for providing a service to a terminal through a plurality of heterogeneous wireless networks, the apparatus comprising:
a controller, comprising hardware, the controller configured to allocate a representative Internet Protocol (IP) address to the terminal and bind a different sub-IP address, allocated to the terminal by the plurality of heterogeneous wireless networks, to the representative IP address for each heterogeneous wireless network which the terminal is currently connected, wherein the terminal is located in a service overlap area of the plurality of heterogeneous wireless networks;
a copy unit configured to copy first IP packets with the representative IP address received from an IP network according to a number of heterogeneous wireless networks to which the terminal is currently connected;
a converter configured to convert the copied first IP packets with the representative IP address into second IP packets with the corresponding sub-IP addresses and transmit the converted second IP packets to the plurality of heterogeneous wireless networks;
a decapsulator configured to decapsulate IP packets received from the plurality of heterogeneous wireless networks; and
a selector configured to sort the IP packets provided from the decapsulator according to sequence numbers, select one IP packet for each sequence number, and transmit the selected IP packets to the IP network.

2. The apparatus of claim 1, wherein the converter is configured to perform the packet conversion by using tunneling or Network Address Translation (NAT).

3. The apparatus of claim 1, wherein the controller is configured to allocate the representative IP address in response to an address registration request message received from the terminal.

4. The apparatus of claim 3, wherein the address registration request message comprises an identifier of the terminal and/or the sub-IP addresses allocated to the terminal by the plurality of heterogeneous wireless networks.

5. The apparatus of claim 1, wherein the decapsulator is configured to perform decapsulation by using tunneling or NAT.

6. The apparatus of claim 1, wherein the selector is configured to select one IP packet for each sequence number by using time stamp information of the IP packets.

7. A terminal comprising:
a plurality of interface modules configured to communicate with a plurality of heterogeneous wireless networks; and
a set of Internet Protocol (IP) conversion sub-layer units configured to bind a different sub-IP address, allocated by the plurality of heterogeneous wireless networks, to a representative IP address allocated to the terminal by an IP conversion server for each heterogeneous wireless network which the terminal is currently connected; sort IP packets received concurrently from the plurality of heterogeneous wireless networks according to sequence numbers; and select one IP packet for each sequence number,
wherein the IP packets received concurrently from the plurality of heterogeneous wireless networks include second IP packets with a corresponding sub-IP addresses converted and copied from first IP packets with the representative IP address received from an IP network according to a number of heterogeneous wireless networks to which the terminal is currently connected,
wherein IP packets transmitted from the terminal are encapsulated, and
wherein the terminal is located in a service overlap area of the plurality of heterogeneous wireless networks.

8. The terminal of claim 7, further comprising an application layer unit configured to operate an application program by using the IP packets provided from the IP conversion sub-layer unit.

9. The terminal of claim 7, wherein, when an IP address is allocated by the plurality of wireless networks, the IP conversion sub-layer unit is configured to transmit an address registration request message to the IP conversion server so as to register the allocated IP address.

10. The terminal of claim 7, wherein the IP conversion sub-layer unit is configured to select one IP packet for each sequence number by using time stamp information of the received IP packets.

11. The terminal of claim 7, wherein the IP conversion sub-layer unit is configured to packetize service data provided from the application layer unit into an IP packet, copy the IP packet according to the number of wireless networks to which the terminal is currently connected, encapsulate the copied IP packets by using corresponding sub-IP addresses, and deliver the encapsulated IP packets to corresponding interface modules.

12. A method of providing a service to a terminal through a plurality of heterogeneous wireless networks in an Internet Protocol (IP) conversion server, the method comprising:
allocating a representative IP address to the terminal in response to an address registration request message received from the terminal which is located in a service overlap area of the plurality of heterogeneous wireless networks;
binding a different sub-IP address, allocated to the terminal by the plurality of heterogeneous wireless networks, to the representative IP address for each heterogeneous wireless network which the terminal is currently connected;
copying first IP packets with the representative IP address received through an IP network according to a number of heterogeneous wireless networks to which the terminal is currently connected;
converting the copied first IP packets with the representative IP address into second IP packets with the sub-IP addresses;
transmitting the converted IP packets to the plurality of heterogeneous wireless networks;
decapsulating the IP packets received from the plurality of heterogeneous wireless networks;
sorting the decapsulated packets according to sequence numbers and selecting one IP packet for each sequence number; and
transmitting the selected IP packets to the IP network.

13. The method of claim 12, wherein the packet conversion is performed by using either Generic Routing Encapsulation (GRE) or Network Address Translation (NAT).

14. The method of claim 12, wherein the address registration request message comprises an identifier of the terminal and/or the sub-IP addresses allocated to the terminal by the plurality of wireless networks.

15. The method of claim 12, wherein, in the selecting, one IP packet is selected for each sequence number by using time stamp information of the IP packets.

16. A communication method of a terminal, the method comprising:

being allocated with a representative Internet Protocol (IP) address by an IP conversion server and binding a different sub-IP address, allocated by the plurality of heterogeneous wireless networks, to the representative IP address for each heterogeneous wireless network which the terminal is currently connected;

receiving IP packets concurrently from the heterogeneous wireless networks when moving to a service overlap area of the heterogeneous wireless networks; and sorting the received IP packets according to sequence numbers and selecting one IP packet for each sequence number, wherein the IP packets received concurrently from the plurality of heterogeneous wireless networks include second IP packets with a corresponding sub-IP addresses converted and copied from first IP packets with the representative IP address received from an IP network according to a number of heterogeneous wireless networks to which the terminal is currently connected, wherein IP packets transmitted from the terminal are encapsulated, and wherein the terminal is located in a service overlap area of the plurality of heterogeneous wireless networks.

17. The method of claim 16, further comprising operating an application program by using the selected IP packets.

18. The method of claim 16, further comprising, when an IP address is allocated by a wireless network, transmitting an address registration request message to the IP conversion server so as to register the allocated IP address.

19. The method of claim 16, wherein, in the selecting, one IP packet is selected for each sequence number by using time stamp information of the received IP packets.

20. The method of claim 16, further comprising:

packetizing service data generated by an application layer unit into an IP packet;

copying the IP packet according to a number of wireless networks to which the terminal is currently connected;

encapsulating the copied IP packets by using corresponding sub-IP addresses; and transmitting the encapsulated IP packets to corresponding wireless networks through corresponding interfaces.

21. A system for communicating packet data, the system comprising:

an Internet Protocol (IP) conversion server configured to bind a different sub-IP address, allocated to the terminal by heterogeneous wireless networks, to a representative IP address allocated to the terminal for each heterogeneous wireless network which the terminal is currently connected, wherein the terminal is located in a service overlap area of the plurality of heterogeneous wireless networks; copy a first IP packet with the representative IP address according to the number of heterogeneous wireless networks to which the terminal is currently connected; convert the copied first IP packets with the representative IP address into second IP packets with the sub-IP addresses; decapsulate IP packets received from the heterogeneous wireless networks; and transmit the converted IP packets to the heterogeneous wireless networks; and the terminal comprising hardware and configured to sort IP packets concurrently received through the heterogeneous wireless networks according to sequence numbers and select one IP packet for each sequence number.

22. The system of claim 21, wherein the IP conversion server is configured to perform the packet conversion by using either Generic Routing Encapsulation (GRE) or Network Address Translation (NAT).

23. The system of claim 21, wherein the terminal is configured to select one IP packet for each sequence number by using time stamp information of the received IP packets.

* * * * *